(12) United States Patent
Raveendran

(10) Patent No.: US 8,253,752 B2
(45) Date of Patent: Aug. 28, 2012

(54) METHOD AND APPARATUS FOR ENCODER ASSISTED PRE-PROCESSING

(75) Inventor: Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 597 days.

(21) Appl. No.: 11/779,869

(22) Filed: Jul. 18, 2007

(65) Prior Publication Data

US 2008/0024513 A1     Jan. 31, 2008

Related U.S. Application Data

(60) Provisional application No. 60/832,348, filed on Jul. 20, 2006.

(51) Int. Cl.
*G09G 5/00* (2006.01)
*G09G 5/02* (2006.01)
*G03F 3/08* (2006.01)
*G06K 9/00* (2006.01)
*G06K 9/36* (2006.01)
*G06K 9/40* (2006.01)
*H04N 9/14* (2006.01)
*H04B 1/66* (2006.01)

(52) U.S. Cl. ........ 345/581; 345/590; 345/606; 345/472; 345/698; 348/387; 348/672; 348/674; 358/519; 358/522; 382/168; 382/232; 382/254; 382/274; 375/240

(58) Field of Classification Search ................ 345/581, 345/589–590, 606, 611–612, 618–619, 660, 345/472, 472.1, 555, 547, 690, 698; 348/384, 348/387, 441, 538, 578, 671–672, 674, 678; 358/519–522; 382/168, 232, 251, 254; 341/51; 714/751–752, 759

See application file for complete search history.

(56) References Cited

U.S. PATENT DOCUMENTS

| | | | |
|---|---|---|---|
| 5,410,351 A | | 4/1995 | Kojima |
| 5,890,120 A | * | 3/1999 | Haskell et al. ............... 704/271 |
| 6,034,733 A | | 3/2000 | Balram et al. |
| 6,134,695 A | * | 10/2000 | Sasaki et al. .................. 714/752 |
| 6,307,887 B1 | | 10/2001 | Gabriel |
| 6,374,197 B1 | | 4/2002 | Ganesh et al. |
| 6,560,285 B1 | | 5/2003 | Reitmier et al. |
| 6,621,865 B1 | | 9/2003 | Yu |

(Continued)

FOREIGN PATENT DOCUMENTS

EP    1215909    6/2002

(Continued)

OTHER PUBLICATIONS

Chuang, et al.: "Thresholding Histogram Equalization," Journal of Digital Imaging, vol. 14, No. 4 (Dec. 1, 2001). pp. 182-185, XP019445727, ISSN: 1618-727X.

(Continued)

*Primary Examiner* — Wesner Sajous
(74) *Attorney, Agent, or Firm* — Elaine Lo

(57) ABSTRACT

This application includes devices and methods for processing multimedia data to generate enhanced multimedia data at a receiver based on encoder assisted pre-processing. In one aspect, processing multimedia data includes identifying at least one pixel intensity range in at least one image of multimedia data, modifying at least a portion of the multimedia data to reduce the pixel intensity range, and encoding the modified multimedia data to form encoded multimedia data.

33 Claims, 10 Drawing Sheets

U.S. PATENT DOCUMENTS

| | | |
|---|---|---|
| 6,879,731 B2 | 4/2005 | Kang et al. |
| 6,909,745 B1 | 6/2005 | Puri et al. |
| 7,280,599 B2 | 10/2007 | Karczewicz et al. |
| 2001/0005222 A1 | 6/2001 | Yamaguchi |
| 2001/0042234 A1* | 11/2001 | Sasaki et al. ............... 714/752 |
| 2003/0018672 A1 | 1/2003 | Chen |
| 2003/0035579 A1 | 2/2003 | Yang et al. |
| 2004/0218830 A1* | 11/2004 | Kang et al. ................ 382/274 |
| 2004/0258319 A1 | 12/2004 | Bruls |
| 2005/0220353 A1* | 10/2005 | Karczewicz et al. ......... 382/238 |
| 2006/0133472 A1 | 6/2006 | Bruls et al. |
| 2006/0146931 A1 | 7/2006 | Boyce |
| 2006/0193384 A1 | 8/2006 | Boyce |
| 2007/0160300 A1 | 7/2007 | Van Vugt et al. |
| 2008/0069203 A1* | 3/2008 | Karczewicz et al. .... 375/240.01 |
| 2008/0298460 A1 | 12/2008 | Wang et al. |
| 2009/0252425 A1 | 10/2009 | Bruls et al. |

FOREIGN PATENT DOCUMENTS

| | | |
|---|---|---|
| JP | 2002542739 A | 12/2002 |
| JP | 2006050042 A | 2/2006 |
| JP | 2007536828 | 12/2007 |
| KR | 19980018215 | 6/1998 |
| KR | 1020010022487 | 3/2001 |
| KR | 1020060126984 | 12/2006 |
| TW | I228917 | 3/2005 |
| WO | WO0064185 A1 | 10/2000 |
| WO | 02089060 | 11/2002 |
| WO | WO2004004354 | 1/2004 |
| WO | 2005057933 | 6/2005 |
| WO | WO2005117447 | 12/2005 |
| WO | WO2006064422 | 6/2006 |

OTHER PUBLICATIONS

Chai, et al.: "Face Segmentation Using Skin-Color Map in Videophone Applications," IEEE Transactions on Circuits and Systems for Video Technology, vol. 9, No. 4 (Jun. 1999). pp. 551-564, XP011014577, ISSN:1051-8215.

Schroder, H.: "Image Processing for TV-Receiver Applications," Image Processing and Its Applications (1992) International Conference on Maastricth, Netherlands, London UK, IEE, pp. 1-8, XP006500107, ISBN: 0-85296-543-5.

International Search Report—PCT/US07/073854—International Search Authority, European Patent Office, Jan. 25, 2008.

Written Opinion—PCT/US2007/073854, International Search Authority, European Patent Office, Jan. 25, 2008.

* cited by examiner

8-BIT FILTER COEFFICIENTS

| *SCALING FACTOR: 1.25 X* | |
|---|---|
| | PHASE 0: [0   255  1    0 ]/256 |
| | PHASE 1: [-4   43   233 -16]/256 |
| | PHASE 2: [-12  108  178 -18]/256 |
| | PHASE 3: [-18  178  108 -12]/256 |
| | PHASE 4: [-16  233  43   -4 ]/256 |
| *SCALING FACTOR: 4/3 X* | |
| | PHASE 0: [0   255  1    0 ]/256 |
| | PHASE 1: [-6   58   222 -18]/256 |
| | PHASE 2: [-16  144  144 -16]/256 |
| | PHASE 3: [-18  222  58  -6 ]/256 |
| *SCALING FACTOR: 1.25 X* | |
| | PHASE 0: [0   255  1    0 ]/256 |
| | PHASE 1: [-16  144  144 -16]/256 |

Figure 8

| FUNCTION SPECIFIER | FUNCTION DESCRIPTION | OPTION SPECIFIER -> 1 | 2 | 3 | 4 |
|---|---|---|---|---|---|
| a | EDGE ENHANCEMENT | DETECTION METHOD (a) | DEBLOCKING-DETECTION METHOD | ADAPTIVE FILTER | |
| b | SCALING | PHASE 1 | PHASE 2 | PHASE 3 | PHASE 4 |
| c | HISTOGRAM EQUALIZATION | FULL RANGE | PARTIAL - 80% | PARTIAL - 70% | PARTIAL - 50% |
| d | GAMMA CORRECTION | WITH DITHERING-BEFORE GAMMA | WITH DITHERING - AFTER GAMMA | NO DITHERING | |
| e | ALPHA BLENDING | ALPHA | | | |
| f | TRANSPARENCY | TRANSPARENCY VALUE | | | |

Figure 9

METHOD AND APPARATUS FOR ENCODER ASSISTED PRE-PROCESSING

This application for patent claims benefit of priority from U.S. Provisional Application No. 60/832,348 entitled "METHOD AND APPARATUS FOR ENCODER ASSISTED POST-PROCESSING" filed Jul. 20, 2006, which is assigned to the assignee hereof and fully incorporated herein by reference for all purposes.

BACKGROUND

1. Field

This application generally is directed to multimedia data processing, and more particularly, to encoding video using decoder processing techniques.

2. Background

There is an ever-increasing demand for transmitting high-resolution multimedia data to display devices, for example, cell phones, computers, and PDA's. High-resolution, a term used herein to indicate a resolution required to see certain desired details and features, is needed for optimum viewing of certain multimedia data, for example, sports, videos, television broadcast feeds, and other such images. Providing high-resolution multimedia data generally requires increasing the amount of data sent to a display device, a process that requires more communication resources and transmission bandwidth.

Spatial scalability is a typical method used to enhance resolution where high resolution information, particularly high frequency data, is encoded and transmitted as an enhancement layer to a base layer of lower resolution data. However, spatial scalability is inefficient since such data has noise-like statistical characteristics and has poor coding efficiency. Additionally spatial scalability is highly restrictive since the up-sampling resolution is pre-determined at the time the enhancement layer is created/encoded. Accordingly, other methods are needed to overcome the deficiencies of spatial scalability and other resolution enhancement methods known in the art.

SUMMARY

Each of the apparatuses and methods described herein has several aspects, no single one of which is solely responsible for its desirable attributes. Without limiting the scope of this disclosure, its more prominent features will now be discussed briefly. After considering this discussion, and particularly after reading the section entitled "Detailed Description" one will understand how the features of this disclosure provides improvements for multimedia data processing apparatuses and methods.

In one embodiment, a method of processing multimedia data, the method includes identifying at least one pixel intensity range in at least one image of multimedia data, modifying at least a portion of the multimedia data to reduce said at least one pixel intensity range, and encoding the modified multimedia data to form encoded multimedia data. Modifying the at least one pixel intensity range can include an inverse histogram equalization operation, gamma correction, or modifying the at least one pixel intensity range based at least in part on a detected range of pixel values and a threshold value which defines a limit to a range of pixel intensity values. The method can further comprise transmitting the encoded multimedia data to a terminal device.

The post-processing technique used in the decoder can comprise histogram equalization, gamma correction, a contrast enhancement process or another pixel intensity re-mapping operation. The method can include maintaining an indicator indicative of the modification made to the multimedia data to reduce said at least one pixel intensity range, and encoding said indicator for transmission to a terminal device. In some embodiments, the terminal device can be configured to use the indicator to adjust said at least one pixel intensity range of multimedia data. Also, the method can include transmitting said indicator multimedia data to a terminal device. An indicator can also be stored, the indicator indicative of a post-processing technique used in a decoder of a terminal device to modify a pixel intensity range, and modifying said at least one pixel intensity range of the multimedia data prior to encoding based on the indicator.

In another embodiment, a system for processing multimedia data, includes an image processing module configured to identify a pixel intensity range of a portion of multimedia data, said image processing module further configured to modify the multimedia data to reduce the pixel intensity range, and an encoder configured to encode the modified multimedia data to form encoded multimedia data. The image processing module can generate an indicator indicative of the modification made to the multimedia data to reduce the pixel intensity range, and wherein said encoder is configured to encode said indicator. In some embodiments, the indicator is transmitted with said encoded multimedia data for use in decoding said encoded multimedia data. The system can further include a storage device configured to store an indicator of a post-processing technique used in a decoder of a terminal device to modify a pixel intensity range, and modifying said at least one pixel intensity range of the multimedia data prior to encoding based on the indicator.

In another embodiment, a system for processing multimedia data, includes means for identifying at least one pixel intensity range in at least one image of multimedia data, means for modifying at least a portion of the multimedia data to reduce said at least one pixel intensity range, and means for encoding the modified multimedia data to form encoded multimedia data.

In another embodiment, a machine readable medium includes instructions for processing multimedia data that upon execution cause a machine to identify at least one pixel intensity range in at least one image of multimedia data, modify at least a portion of the multimedia data to reduce said at least one pixel intensity range, and encode the modified multimedia data to form encoded multimedia data.

BRIEF DESCRIPTION OF THE DRAWINGS

FIG. 8 is a table illustrating examples of interpolation filter coefficient factors.

FIG. 9 is a table illustrating indicators to specify the type of post-processing operations to be performed at a decoder, and their parameters.

DETAILED DESCRIPTION

Figure 1:
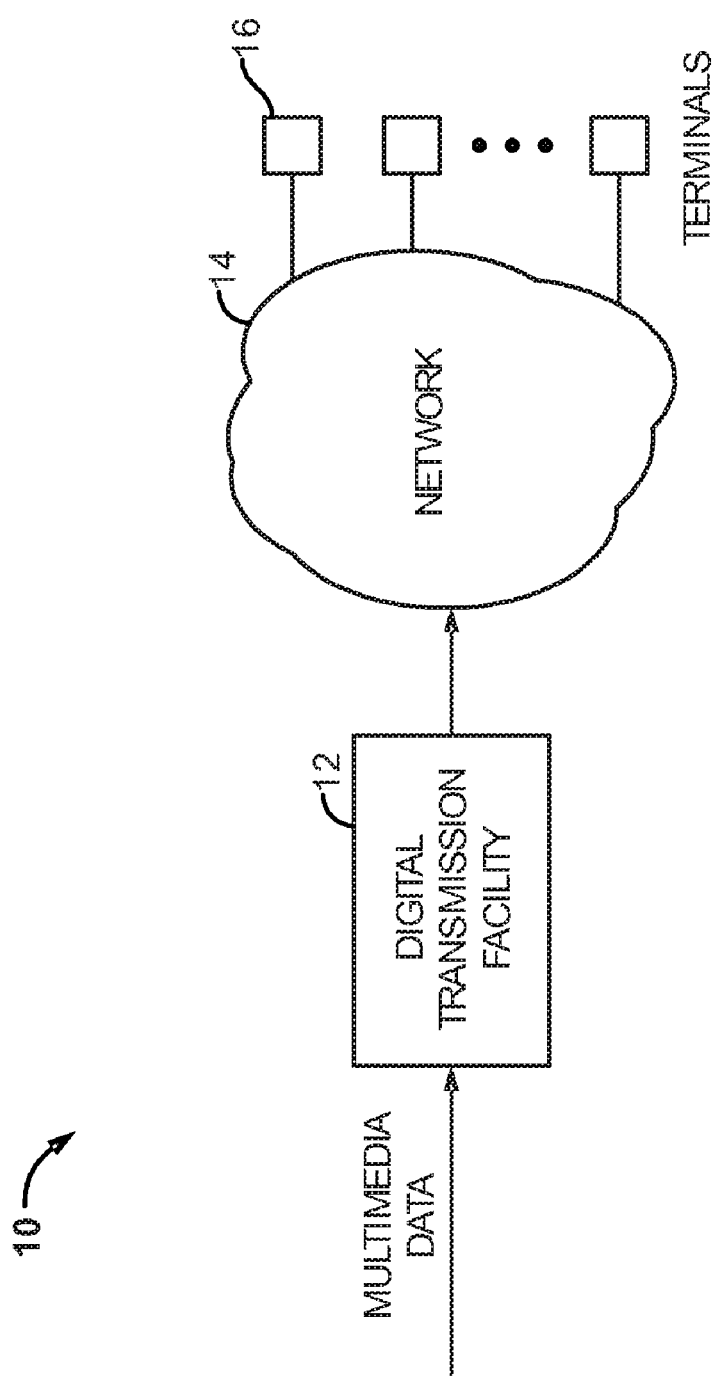
FIG. 1 is a block diagram illustrating a communications system for delivering multimedia.

In the following description, specific details are given to provide a thorough understanding of the described aspects. However, it will be understood by one of ordinary skill in the art that the aspects may be practiced without these specific details. For example, circuits may be shown in block diagrams in order not to obscure the aspects in unnecessary detail. In other instances, well-known circuits, structures and techniques may not be shown in detail in order not to obscure the aspects.

References herein to "one aspect," "an aspect," some aspects," or "certain aspects," and similar phrases using the terms "embodiment" or "embodiments," mean that one or more of a particular feature, structure, or characteristic described in connection with the aspect can be included in at least one aspect. The appearances of such phrases in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

"Multimedia data" or just "multimedia" as used herein is a broad term that includes video data (which can include audio data), audio data, or both video data and audio data and may also include graphics data. "Video data" or "video" as used herein as a broad term, referring to sequences of images containing text or image information and/or audio data.

In order to provide desired high resolution multimedia data to one or more display devices, spatial scalability and up-sampling algorithms typically include image or edge enhancement techniques that employ edge detection followed by linear or adaptive (sometimes non-linear) filtering processes. However, critical and fine detail edges that are lost during compression and down-sampling at an encoder cannot be detected through these mechanisms with a high percentage of confidence, or be effectively re-created during decoding and up-sampling. Certain features of the methods and systems described herein include processes to identify information relating to details of multimedia data that are lost due to compression. Other features are related to restoring such details in the decoded multimedia data by using such information. Introduced here, such systems and methods are further described and illustrated in relation to FIGS. 1-7. In one exemplary embodiment, to facilitate a process for encoding multimedia data, an encoding method can use information related to a post-processing or decoding process (e.g., at the display device) to encode multimedia data to account for data discrepancies that are produced by a particular encoding and/or decoding process (e.g., a down-sampling implemented in an encoder and/or an up-sampling algorithm(s)) implemented in the decoder).

In one example, the multimedia data is first encoded (e.g., down-sampled and compressed) forming compressed data which is to be subsequently transmitted to at least one display device. A copy of the encoded data is decompressed and up-sampled using the known decoding and up-sampling algorithm(s) of the decoder, and the resulting data is compared to the originally received (uncompressed) multimedia data. Differences between the original multimedia data and the decompressed up-sampled data are represented as "difference information." Enhancement processes incorporated in the post-processing techniques (e.g., down-sampling and up-sampling filters) can remove noise, enhance features (e.g., skin, facial features, quickly-changing areas in the data indicative of "fast-moving" objects), or reduce entropy in the generated difference information. The difference information is encoded as "assist information." The assist information is also transmitted to the decoder where it is used to enhance details of a decoded image that may have been degraded during encoding. An enhanced image can then be presented on a display device.

FIG. 1 is a block diagram of a communications system 10 for delivering streaming or other types of multimedia data. This technique finds application in a digital transmission facility 12 that transmits digital compressed multimedia data to a multiplicity of display devices or terminals 16. The multimedia data received by the transmission facility 12 can be a digital video source, for example, a digital cable feed or an analog high signal/ratio source that is digitized. The video source is processed in the transmission facility 12 and modulated onto a carrier for transmission over a network 14 to one or more terminals 16.

The network 14 can be any type of network, wired or wireless, suitable for transmitting data, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO™ system, a DMB system, or a DVB-H system. For example, the network can be cellular phone network, a global computer communications network such as the Internet, a wide area network, a metropolitan area network, a local area network, and a satellite network, as well as portions or combinations of these and other types of networks.

Each terminal 16 that receives the encoded multimedia data from the network 14 can be any type of communication device including, but not limited to, a wireless phone, a personal digital assistant (PDA), a personal computer, a television, a set-top box, a desktop, laptop or palmtop computer, (PDA), a video/image storage device such as a video cassette recorder (VCR), a digital video recorder (DVR), etc., as well as portions or combinations of these and other devices.

Figure 2:
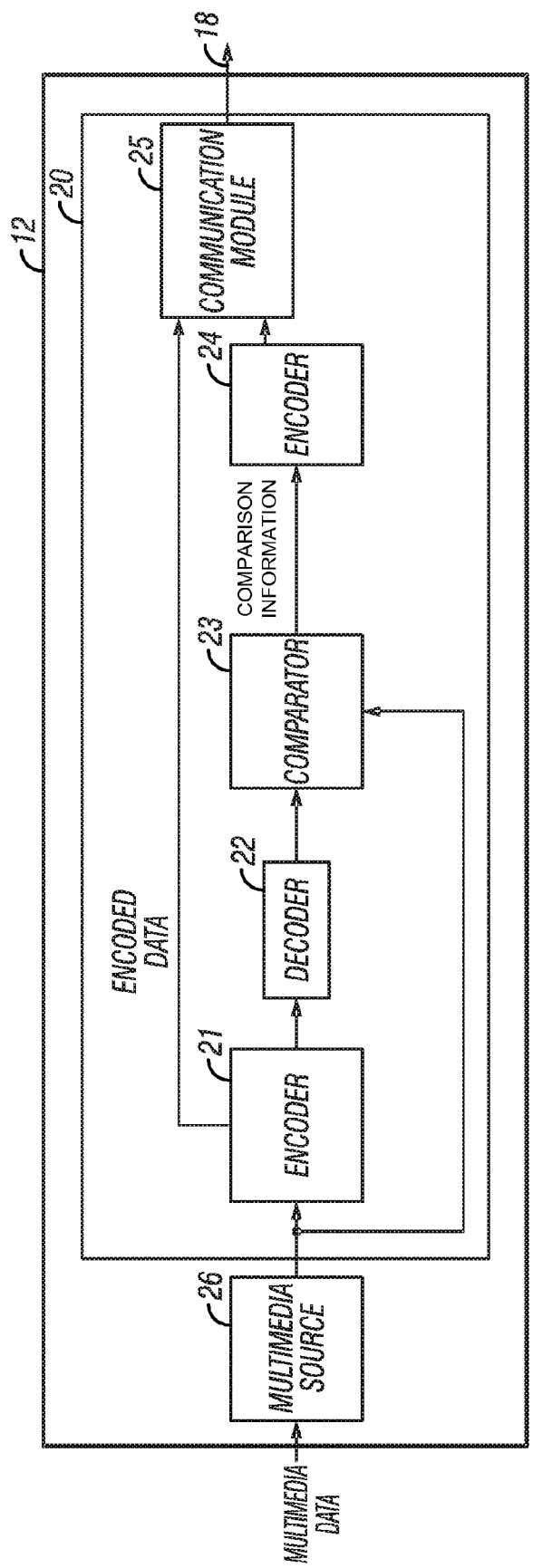
FIG. 2 is a block diagram illustrating certain components of a communication system for encoding multimedia.

FIG. 2 is a block diagram illustrating certain components of a communication system in the digital transmission facility 12 for encoding multimedia. The transmission facility 12 includes a multimedia source 26 configured to provide multimedia data to an encoding device 20 based on multimedia it receives or otherwise has access to, e.g., from a storage device. The encoding device 20 encodes the multimedia data based (at least in-part) on information related to a decoding algorithm that is, or could be, used subsequently in a downstream receiving device such as terminal 16.

The encoding device 20 includes a first encoder 21 for encoding the multimedia data. The first encoder 21 provides the encoded multimedia data to a communication module 25 for transmission to one or more of the terminals 16. The first encoder 21 also provides a copy of the encoded data to a decoder 22. The decoder 22 is configured to decode encoded data and apply a post-processing technique that is preferably also used in the decoding process in a receiving device. The decoder 22 provides the decoded data to a comparator 23.

An indicator is identified for use by the decoder 22, the indicator being indicative of the post-processing technique. "Identified" as used in the preceding sentence refers to the decoder maintaining, storing, selecting, or having access to the indicator. In some embodiments, the indicator can be maintained or stored in a memory device of the decoder 22, or in another device in communication with the decoder 22. In some embodiments, the indicator can be selected from a plurality of indicators, each indicator indicative of a post-processing technique. In some embodiments, the decoder 22 can also use other known or typical processing techniques without knowing the specific processing technique used by a decoder in a receiving device.

The decoder 22 can be configured to perform one or more post-processing techniques. In some embodiments, the decoder 22 is configured to use one of a plurality of post-processing techniques based on an input indicating which technique to employ. Typically, as a result of compression and downsampling processes used in the first encoder 21 for encoding the multimedia data, and decompression and upsampling processes used in the decoder 22 for decoding the multimedia data, the decoded data will likely be at least somewhat different (and degraded) from the original multimedia data. The comparator 23 is configured to receive and compare the original multimedia data and the decoded multimedia data and determine comparison information. The comparison information can include any information determined by comparing the original multimedia data and the decoded multimedia data. In some embodiments, the comparison data comprises differences in the two data sets and is referred to as "difference information." Difference information can be generated on, for example, a frame-by-frame basis. The comparison may also be done on a block-by-block basis. A block, referred to herein, can vary from a "block" of one pixel (1×1) to a "block" of pixels of M×N arbitrary size. The shape of the block is not necessarily square.

The "difference information" is representative of the image degradation that is seen in the multimedia data displayed at a terminal 16 as a result of the encoding/decoding process. The comparator 23 provides the comparison information to second encoder 24. The comparison information is encoded in the second encoder 24, and the encoded "assist information" is provided to the communication module 25. The communication module 25 can transmit data 18 comprising the encoded multimedia and the encoded assist information to a terminal device 16 (FIG. 1). A decoder in the terminal device uses the "assist information" to add enhance (e.g., add details) to the decoded multimedia data that were affected or degraded during encoding and decoding. This enhances the image quality of the received encoded multimedia data and so that a higher resolution decoded image can be presented on the display device. In some embodiments, the first encoder 21 and the second encoder 24 can be implemented as a single encoder.

The post-processing techniques can comprise one or more techniques that enhance certain features in the multimedia data (e.g., skin and facial features). The encoded difference information is transmitted to the receiving device. The receiving device adds details to the decoded images using the assist information to compensate for details that were affected during encoding and decoding. Thus, a higher resolution and/or a higher quality image can be presented on the receiving device.

The difference information is identified as assist information in the main coded bitstream. User data or "filler" packets can be used to adapt the size of the coded data to the size of the transmission protocol packet size (e.g., an IP datagram or MTU) of the coded media data to transport the assist information. In some embodiments, the difference information can be identified as a set of relationships (e.g., equations, decision logic, number and location of quantized residual coefficients, fuzzy logic rules) of existing information in low-res coded data, and an index into these relationships can be encoded as assist information. Since not all the difference information is necessarily encoded and the format of this information can be reduced to indices of look-up tables of relationships, the encoder assisted up-sampling metadata encodes more efficiently and exploits information in the receiving device to reduce entropy of the information required to be transmitted.

Figure 3:
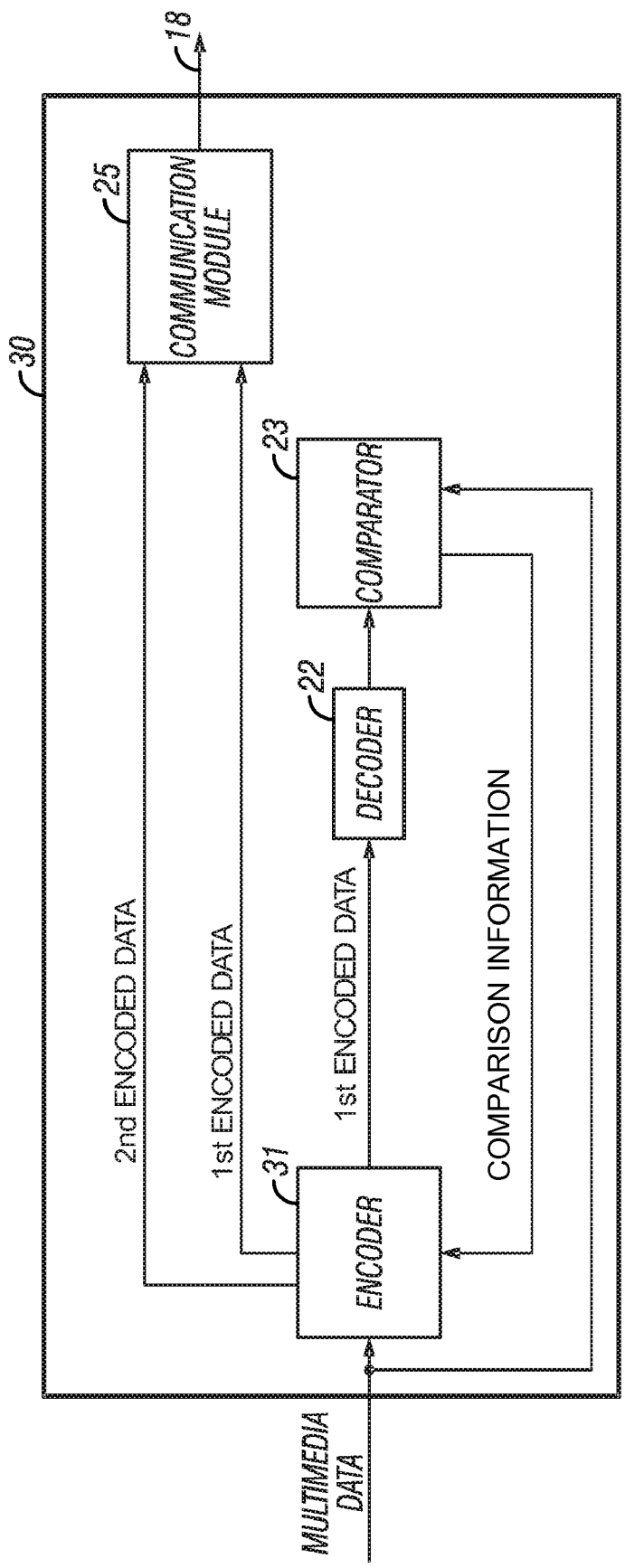
FIG. 3 is a block diagram illustrating another embodiment of certain components of a communication system for encoding multimedia.

Other configurations of the described encoding device 20 are also contemplated. For example, FIG. 3 illustrates an alternative embodiment of an encoding device 30 that uses one encoder 31 instead of two encoders (as shown in FIG. 2). In this embodiment, the comparator 23 provides the difference information to the single encoder 31 for encoding. Encoder 31 provides encoded multimedia data (e.g., first encoded data) and encoded assist information (e.g., second encoded data) to the communication module 25 for transmission to terminals 16.

Figure 4:
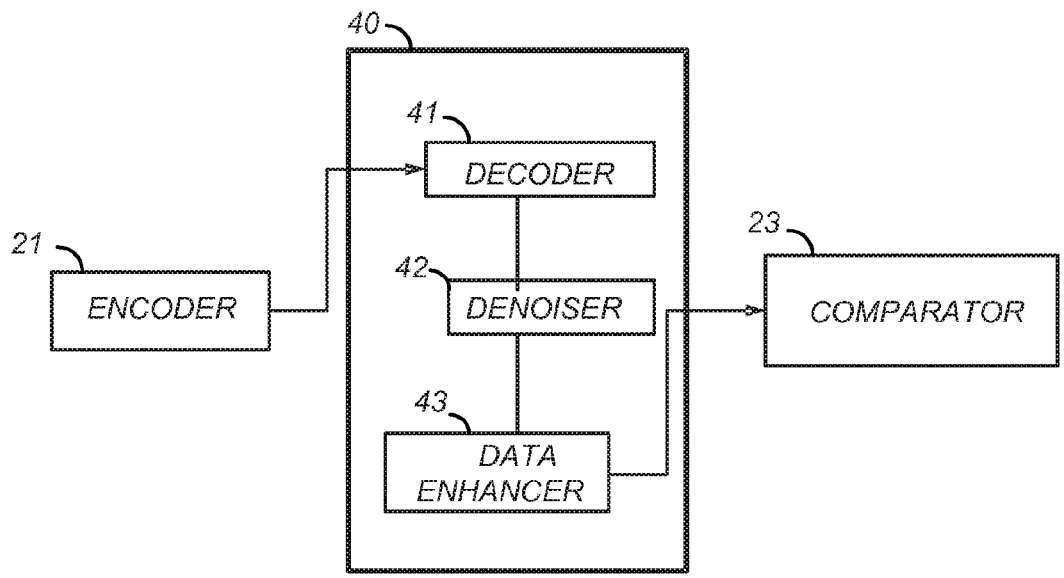
FIG. 4 is a block diagram illustrating another embodiment of certain components for encoding multimedia.

FIG. 4 is a block diagram illustrating an example of a portion of the systems shown in FIGS. 2 and 3, in particular an encoder 21, a decoder 40, and a comparator 23. The decoder 40 is configured for decoding encoded multimedia data and applying post-processing techniques that are used in the receiving terminal 16 (FIG. 1). The functionality of decoder 40 can be implemented in the encoders described herein, for example, the decoder 22 illustrated in FIGS. 2 and 3. The decoder 22 receives encoded multimedia data from the encoder 21. A decoder module 41 in the decoder 40 decodes the encoded multimedia data and provides the decoded data to post-processing modules in the decoder 40. In this example, the post-processing modules include a denoiser module 42 and a data enhancer module 43.

Usually noise in a video sequence is assumed to be additive white Gaussian. However, a video signal is highly correlated both in time and space. Therefore, it is possible to partially remove noise from a signal by making use of its whiteness both temporally and spatially. In some embodiments, the denoiser module 42 includes temporal denoising, for example a Kalman filter. The denoiser module 42 can include other denoising processes, for example, a wavelet shrinkage filter and/or a wavelet Wiener filter. Wavelets are a class of functions used to localize a given signal in both space and scaling domains. The fundamental idea behind wavelets is to analyze the signal at different scales or resolutions such that small changes in the wavelet representation produce a correspondingly small change in the original signal. Wavelet shrinkage or a wavelet Wiener filter can be also be applied as the denoiser 41. Wavelet shrinkage denoising can involve shrinking in the wavelet transform domain, and typically comprises three steps: a linear forward wavelet transform, a nonlinear shrinkage denoising, and a linear inverse wavelet transform. The Wiener filter is a MSE-optimal linear filter which can be used to improve images degraded by additive noise and blurring. In some aspects, a denoising filter is based on an aspect of a (4, 2) bi-orthogonal cubic B-spline wavelet filter.

The denoiser module 42 provides denoised decoded data to a data enhancer module 43. The data enhancer module 43 can be configured to enhance certain features of the data deemed desirable for viewing, for example, skin, facial features, and quickly changing data (e.g., for multimedia data associated with a sporting event). The primary function of the data enhancer module is to provide image or video enhancements during playback or consumption of the data. Typical image enhancements include sharpening, color gamut/saturation/hue improvements, contrast improvement, histogram equalization, and high frequency emphasis. With respect to enhancing skin features, several skin tone detection methods exist. Once the region with the skin tone is identified in the image, the chroma components corresponding to this region could be modified to improve the hue to suit a desired color palette.

With respect to improving facial features, if ringing noise is detected in facial features, identified for example through skin-tone-detection, de-ringing filters and/or appropriate smoothing/noise reduction filters can be applied to minimize these artifacts and perform context/content selective image enhancements. Video enhancements include flicker reduction, frame rate enhancement, etc. Sending an indicator of average luminance across a group of frames in video can help decoder/post-decoder/post processing related to flicker reduction. Flicker is often caused by DC quantization leading to the reconstructed video having fluctuations in average luminance level across those frames that were present in the original with the same lighting conditions/luminance. Flicker reduction typically involves computation of average luminance (e.g., DC histogram) for contiguous frames and applying an averaging filter to bring the average luminance of each frame back to the computed average luminance over the frames in question. In this case, the difference information could be the pre-computed average luminance shift to be applied for each frame. The data enhancer module 43 provides the enhanced decoded multimedia data to a comparator 23.

Figure 5:
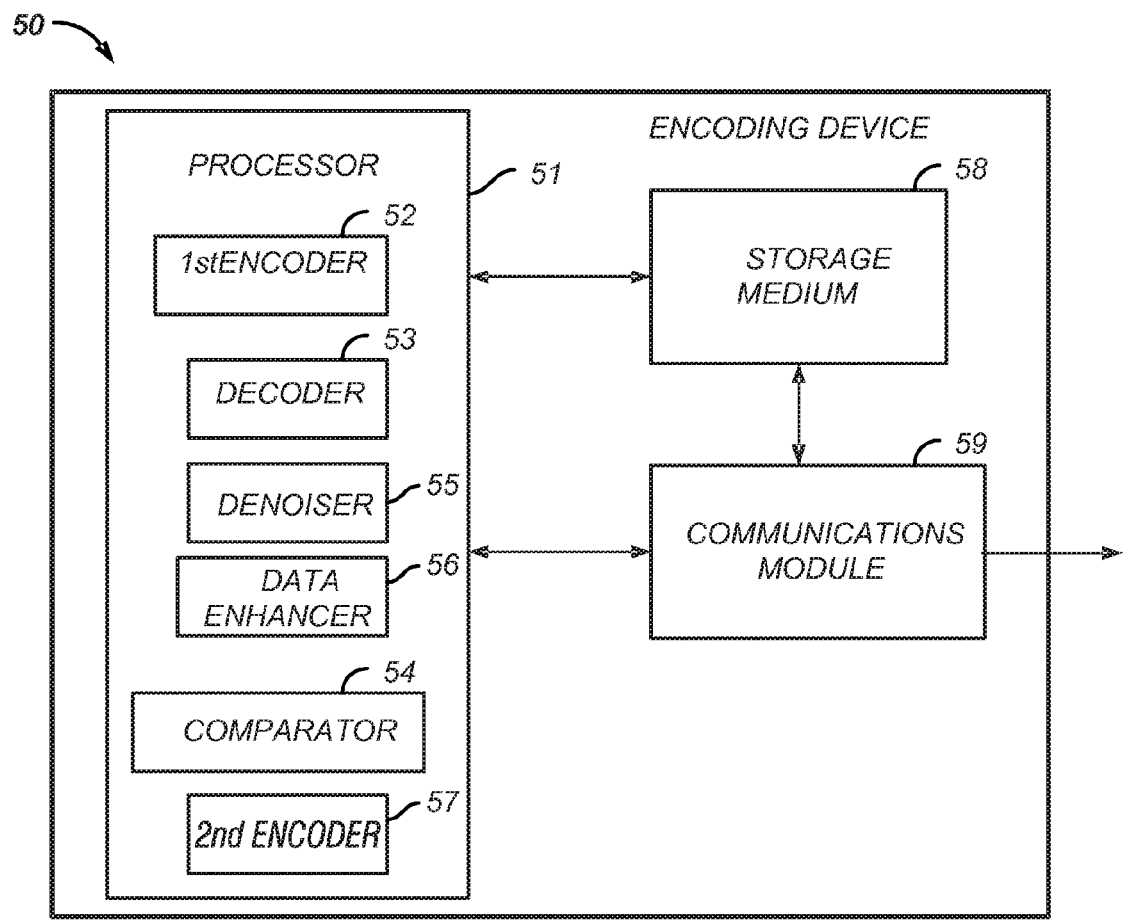
FIG. 5 is a block diagram illustrating an encoding device having a processor configured for encoding multimedia data.

FIG. 5 is a block diagram illustrating an example of an encoding device 50 having a processor 51 configured for encoding multimedia data. The encoding device 50 can be implemented in a transmission facility, for example, the digital transmission facility 12 (FIG. 1). The encoding device 50 includes a storage medium 58 configured to communicate with the processor 51 and configured to communicate with a communication module 59. In some embodiments, the processor 51 is configured to encode multimedia data similarly to the encoder 20 illustrated in FIG. 2. The processor 51 encodes received multimedia data using first encoder module 52. The encoded multimedia is then decoded using decoder module 53, which is configured to decode the multimedia data using at least one post-processing technique that is implemented in a terminal 16 (FIG. 1). The processor 51 removes noise in the decoded multimedia data using a denoiser module 55. The processor 51 can include a data enhancer module 56 which is configured to enhance the decoded multimedia data for predetermined features such as facial features or skin.

Differences between the decoded (and enhanced) multimedia data and the original multimedia data are determined by a comparator module 54 which generates difference information representing the differences between the decoded multimedia data and the original multimedia data. The enhanced difference information is encoded by the second encoder 57. The second encoder 57 generates encoded assist information which is provided to the communications module 59. The encoded multimedia data is also provided to the communications module 59. Both the encoded multimedia data and the assist information are communicated to a display device (e.g., terminal 16 FIG. 1), which decodes the multimedia data using the assist information to produce an enhanced multimedia data.

Figure 6:
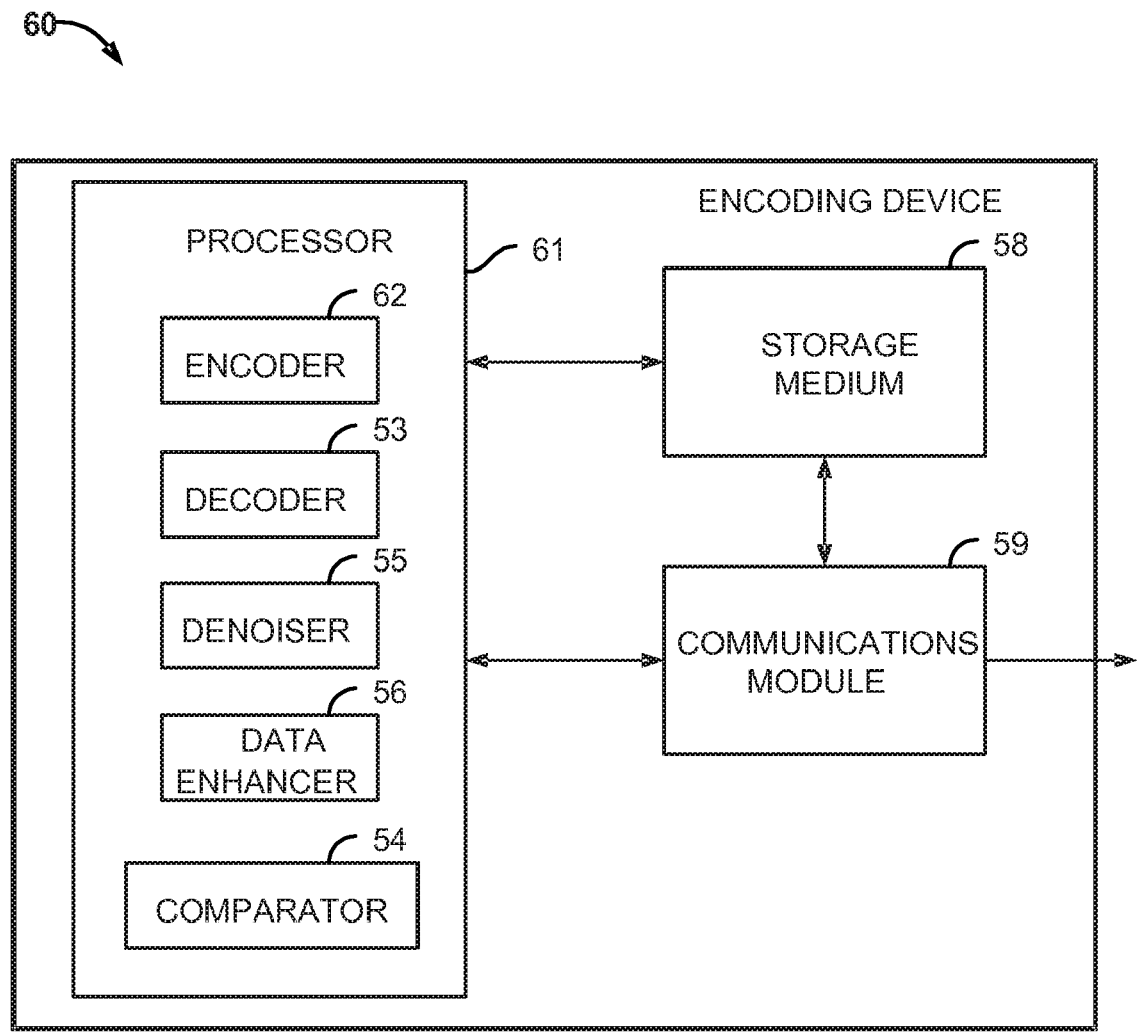
FIG. 6 is a block diagram illustrating another embodiment of an encoding device having a processor configured for encoding multimedia data.

FIG. 6 is a block diagram illustrating another embodiment of an encoding device 60 having a processor 61 configured for encoding multimedia data. This embodiment can encode multimedia data similarly to FIG. 5, except that the processor 61 contains one encoder 62 which encodes both the multimedia data and the difference information. Both the encoded multimedia data and the assist information are then communicated to a display device (e.g., terminal 16 FIG. 1) by the communications module 59. A decoder in the display device then decodes the multimedia data using the assist information to produce enhanced resolution data and displays such data.

Examples of certain post-processing techniques that can be implemented in a decoder are listed herein below, however, the description of these examples is not meant to limit the disclosure to only those techniques described. As described above, the decoder 22 can implement any of a number of post-processing techniques to identify difference information and generate corresponding assistance information.

Chroma Processing

One example of a post-processing technique is chroma processing, which refers to operations pertaining to the chromaticity of the multimedia data to be displayed. Color space conversion is one such example. Typical compression operations (decoding, de-blocking, etc.) and some post-processing operations (e.g., a function where intensity represented by luma or the Y component is modified independent of chroma, such as histogram equalization) occur in the YCbCr or YUV domain or color space while displays usually operate in the RGB color space. Color space conversion is performed in post-processors and display processors to address this difference. Data conversions between RGB and YCC/YUV can result in a data compression if the same bit-depth is maintained because redundancies in intensity information in R, G and B are decreased when they are transformed to the Y component, resulting in considerable compression of the source signal. Accordingly, any post-processing based compression would potentially operate in the YCC/YUV domain.

Chroma subsampling relates to the practice of implementing more resolution for the (quantity representation of) luminance than the (quantity representative of) color. It is used in many video encoding schemes (both analog and digital) and also in JPEG encoding. In chroma subsampling, the luma and chroma components are formed as a weighted sum of gamma-corrected (tristimulus) R'G'B' components instead of linear (tristimulus) RGB components. The subsampling scheme is commonly expressed as a three part ratio (e.g., 4:2:2), although sometimes expressed as four parts (e.g. 4:2:2:4). The four parts are (in their respective order) a first part luma horizontal sampling reference (originally, as a multiple of 3.579 MHz in the NTSC television system), a second part Cb and Cr (chroma) horizontal factor (relative to first digit, a third part which is the same as second digit, except when zero which indicates Cb and Cr are subsampled 2:1 vertically, and if present, a fourth part which is the same as luma digit (indicating an alpha "key" component). A post-processing technique can include chroma upsampling (e.g., converting 4:2:0 data to 4:2:2 data) or downsampling (e.g., converting 4:4:4 data to 4:2:0 data). Low-to-mid bit rate compression is typically performed on 4:2:0 video. If the source multimedia data is of a higher chrominance than 4:2:0 (e.g., 4:4:4 or 4:2:2), it can be downsampled to 4:2:0, encoded, transmitted, decoded and then upsampled back to original chrominance during the post-processing operation. At the display device, when transforming to RGB for display, the chrominance is restored to its full 4:4:4 ratio. The decoder 22 can be configured with such post-processing operations to replicate the decoding/processing operations that might occur at a downstream display device.

Graphics Operations

Post-processing techniques relating to graphics processing can also be implemented in the decoder 22. Some display devices include graphics processors, for example, display devices that support multimedia and 2D or 3D gaming. The functionality of a graphic processor can include pixel processing operations some (or all) of which may be suitably applied to improve video quality or potentially incorporated in video processing including compression/decompression.

Alpha-Blend

Alpha-blend, an operation typically used in transitioning between two scenes or in overlay of video over an existing screen on a GUI, is one example of a pixel operation post-processing technique that can also be implemented in the decoder 22. In alpha-blend, the value of alpha in the color code ranges from 0.0 to 1.0, where 0.0 represents a fully transparent color, and 1.0 represents a fully opaque color. To "blend," a pixel read from a picture buffer is multiplied by an "alpha." A pixel read from a display buffer is multiplied by one minus alpha. The two are added together and the result is displayed. Video content contains various forms of transition effects, including: fade transitions from/to black or other uniform/constant color, cross fades between scenes, and splice points between types of content (e.g., animation to commercial video etc.). The H.264 standard has provisions to communicate alpha value and indicators for start and stop points using frame numbers or POC (picture order count) for the transition. The uniform color for the transition may also be specified.

Transition regions can be difficult to encode since they are not abrupt scene changes where the start (first frame) of the new scene could be coded as an I-frame and subsequent frames as predicted frames. Due to the nature of motion estimation/compensation techniques that are typically used in decoders, motion can be tracked as blocks of data and constant luminance shifts are absorbed into the residual (weighted prediction may resolve this to some extent). Cross fades are more of a problem since the change in luminance and the motion being tracked is not true motion but a gradual switch from one image to another resulting in large residuals. These large residuals after quantization (course for low bitrates) result in large scale motion and blocking artifacts. Coding the complete images that define the transition region and specifying an alpha-blending configuration to affect the fade/cross fade would result in artifact free playback of the transition and improvement in compression efficiency/ratio or reduction in bitrate for similar or better perceptive/visual quality relative to instances where blocking artifacts are induced.

Knowledge of the alpha-blending capabilities of the decoder at the encoder can facilitate coding of the transition effect as metadata instead of spending bits on large residual through conventional coding. Some examples of such metadata include, in addition to the alpha value, an index into a set of transition effects supported at the decoder/post-processor such as zooming, rotation, dissolve, and fading.

Transparency

"Transparency" is another relatively simple post-processing pixel operation that can be included in the decoder 22 of the encoding device 20. In a transparency process, a pixel value is read out of the display buffer and another pixel value is read out of the picture buffer (frame to be displayed). If the value read out of the picture buffer matches the transparency value, the value read from the display buffer is written to the display. Otherwise the value read from the picture buffer is written to the display.

Video Scaling (x2, /2, /4, Arbitrary Scale)

The intention of video scaling (both "upscaling" or "downscaling") is typically to preserve as much of the original signal information and quality while migrating the information conveyed in one signal format or resolution to another different signal format or resolution. It works either in downscaling by two (2) or four (4) times and is performed through simple averaging of pixel values. Upscaling involves interpolation filters, and can be done on both axes. Bi-cubic interpolation is performed on the Y values and nearest neighbor filtering is performed on chroma values.

For example, the interpolated values of Y can be calculated by:

$$Y[i, j] = \frac{-Y[i-3, j] + 9Y[i-1, j] + 9Y[i+1, j] - Y[i+3, j]}{16} \quad \text{Eq. 1}$$

for each interpolated Y in a row, and $$Y[i, j] = \frac{-Y[i, j-3] + 9Y[i, j-1] + 9Y[i, j+1] - Y[i, j+3]}{16} \quad \text{Eq. 2}$$

for each interpolated Y in a column.

From side-by-side comparisons the bilinear and bi-cubic interpolation schemes show very little visible difference. Bi-cubic interpolation results in a slightly sharper image. A larger line buffer has to be built in order to do bi-cubic interpolation. All bi-cubic filters are one dimensional, with coefficients only dependent on the scaling ratio. In one example, 8 bits are sufficient to code the coefficients to guarantee image quality. All coefficients only need to be coded as unsigned, and the signs can be hard coded with the circuitry. The signs for the coefficients are always [−++−] for bi-cubic interpolation.

FIG. 8 shows various choices of filters for a given scale factor. The scale factors listed in FIG. 8 are examples of those that are most commonly encountered in mobile devices. For each scale factor, the different phases of a filter can be selected based on the type of edge detected and the desired roll off characteristics. Some filters work better than others for certain texture and edge regions. The filter taps were derived based on experimental results and visual evaluations. In some embodiments, a moderately sophisticated scaler at a receiver (decoder/display driver), can adaptively choose between the filters on a block/tile basis. An encoder, being aware of the features in the scaler of the receiver, can indicate (based on comparisons with the original) which of filters to choose for each block (e.g., provide an index into a table of filters). This approach can be an alternative to the decoder deciding on the appropriate filter through edge detection. It minimizes processing cycles and power in the decoder because it does not have to perform decision logic associated with edge detection (e.g., pruning and directional operations that consume many processor cycles).

Gamma Correction

Gamma correction, gamma nonlinearity, gamma encoding, or often simply gamma, is the name of a nonlinear operation used to code and decode luminance or tristimulus values in video or still image systems, and it is also another post-processing technique that can be implemented in decoder 22. Gamma correction controls the overall brightness of an image. Images which are not properly corrected can look either bleached out, or too dark. Trying to reproduce colors accurately also requires some knowledge of gamma correction. Varying the amount of gamma correction changes not only the brightness, but also the ratios of red to green to blue. Gamma correction is, in the simplest cases, defined by the following power-law expression:

$$V_{out} = V_{in}^{\gamma} \quad \text{Eq. 3}$$

where the input and output values are non-negative real values, typically in a predetermined range such as 0 to 1. The case $\gamma<1$ is often called gamma compression and $\gamma>1$ is called gamma expansion. In implementations where decoder post-processing includes gamma correction, a corresponding gamma post-processing technique can be implemented in the decoder 22. Typically, gamma correction is done in the analog domain inside the LCD panel. Typically, dithering follows gamma correction, although in some cases dithering is performed first.

Histogram Equalization

Histogram equalization is the process of modifying the dynamic range of the pixels in an image using a histogram of the pixel values. Typically, the information in an image is not evenly distributed across the possible range of values. This pixel intensity frequency distribution of an image can be illustrated by graphing the number of pixels (y-axis) versus the brightness (e.g., from 0-255 for an eight-bit monochrome image) of each pixel (x-axis) to form an image histogram. An image histogram shows a graphical representation of how many pixels within an image fall into the various brightness level boundaries. Dynamic range is a measure of how wide the occupied portion of the histogram is. Generally, an image having a small dynamic range also has low contrast, and an image having a large dynamic range has a high contrast. The dynamic range of an image can be changed using a mapping operation, for example, histogram equalization, contrast or gamma adjustment, or another remapping operation. When the dynamic range of an image is reduced, the resulting "flattened" image can be represented (and encoded) using fewer bits.

A dynamic range adjustment can be performed on a pixel intensity range, e.g., a range of pixel brightness values. Although typically performed on the entire image, dynamic range adjustments can also be made to a portion of an image, e.g., an identified pixel intensity range representative of a portion of the image. In some embodiments, an image can have two or more identified portions (e.g., differentiated by different image subject matter content, spatial location, or by different portions of a image histogram) and the dynamic range of each portion can be adjusted separately.

Histogram equalization can be used to increase the local contrast of images, especially when the usable data of the image is represented by close contrast values. Through this adjustment, the intensities can be better distributed on the histogram. This allows for areas of lower local contrast to gain a higher contrast without affecting the global contrast. Histogram equalization accomplishes this by effectively spreading out the pixel intensity values. The method is useful in images with backgrounds and foregrounds that are both bright or both dark.

Although histogram equalization improves contrast, it also reduces compression efficiency of images. In some encoding processes, an "inverse" of histogram equalization property can be used prior to encoding to improve compression efficiency in general. In an inverse histogram equalization process, the pixel brightness values are re-mapped to reduce contrast; the resulting image histogram has a smaller (compressed) dynamic range. In some embodiments of such a process, a histogram of each image can be derived before encoding the images. The luminance range of pixels in an image of multimedia can be scaled to effectively compress the image histogram to a narrower range of the luminance values. Accordingly, the contrast of the image can be reduced. When such an image is compressed, the encoding efficiency is higher than without the histogram compression due to low/small range of luminance values. When the image is decoded at a terminal device, a histogram equalization process running on the terminal device restores the contrast of the image to the original distribution. In some embodiments, the encoder can maintain (or receive) an indicator identifying the histogram equalization algorithm used in the decoder at the terminal device. In such cases, the encoder can use the inverse of the histogram equalization algorithm to improve compression efficiency and then provide enough information to the decoder for restoration of the contrast.

Figure 11:
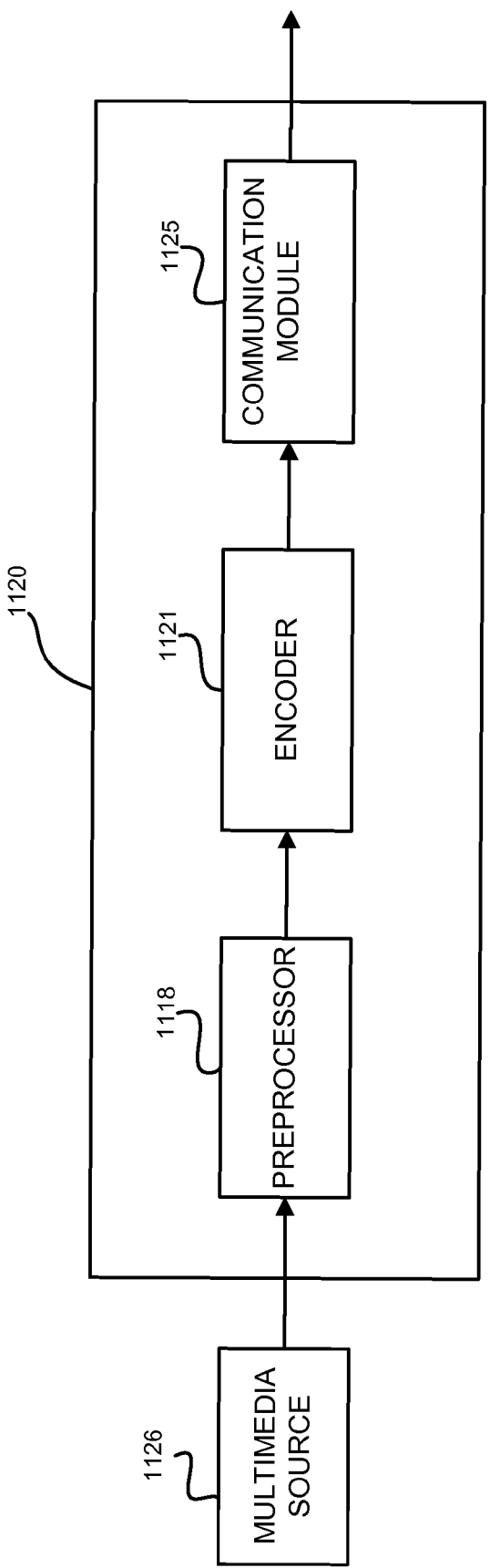
FIG. 11 is a block diagram of an encoding device having a preprocessor configured to modify multimedia data prior to encoding.

FIG. 11 illustrates an embodiment of an encoding device 1120 that can reduce the dynamic range of multimedia data before it is encoded in order to encode the multimedia data using fewer bits. In FIG. 11, a multimedia source 1126 provides multimedia data to an encoding device 1120. The encoding device 1120 includes a preprocessor 1118 that receives the multimedia data and reduces the dynamic range of at least one image contained in the multimedia data. The resulting data "compression" reduces the size of the multimedia data and correspondingly reduces the amount of multimedia data that needs to be encoded. The resulting data is provided to an encoder 1121.

The encoder 1121 encodes the adjusted multimedia data and provides the encoded data to a communication module 1125 for transmission to a terminal device 16 (e.g., a handset), as illustrated in FIG. 1. In some embodiments, information associated with the dynamic range adjustment is also provided to the encoder 1121. The information can be maintained in the encoding device 1121 as an indicator indicative of the modification made to the pixel intensity range. If information (or an indicator) associated with the dynamic range adjustment is provided, the encoder 1121 can also encode such information and provide it to the communication module 1125 for transmission to the terminal device 16. Subsequently, the terminal device 16 remaps (expands) the dynamic range of the image before it is displayed. In some embodiments, an encoder such as encoder 21 of FIG. 2 can be configured to perform this preprocessing dynamic range adjustment. In some embodiments, the preprocessing dynamic range adjustment can be performed in addition to other encoding embodiments, including the encoding embodiments described herein, for example, in reference to FIGS. 1-9.

Metadata (or indicators) to specify the type of post-processing operations to be performed at the decoder and their parameters are illustrated in FIG. 9. Options for scaling are different sets of coefficients for interpolation filters described in FIG. 9. The function specifier is an index of a set of post-processing functions listed in column 2 of the table illustrated in FIG. 9. The encoder may select from this set, the function (on a block basis) that produces the least entropy of the difference information to be coded. Optionally, the selection criteria could also be the highest quality, quality being measured through some objective means such as PSNR, SSIM, PQR, etc. Additionally for each function specified, a set of options are provided based on the method used for this function. For example, edge enhancement can occur out-of-loop using edge detection methods (e.g., a set of Sobel filters or 3×3 or 5×5 Gaussian masks) followed by high-frequency emphasis. In some embodiments, edge enhancement can occur in-loop using the in-loop deblocker circuitry. In the latter case, the edge detection method used during the in-loop deblocking is used to identify edges and a complimentary function to the normal low pass filtering done by the deblocking filter would be a sharpening filter to enhance edges. Similarly histogram equalization has options to equalize across the full range of intensity values or partial and gamma correction has options for dithering.

Figure 7:
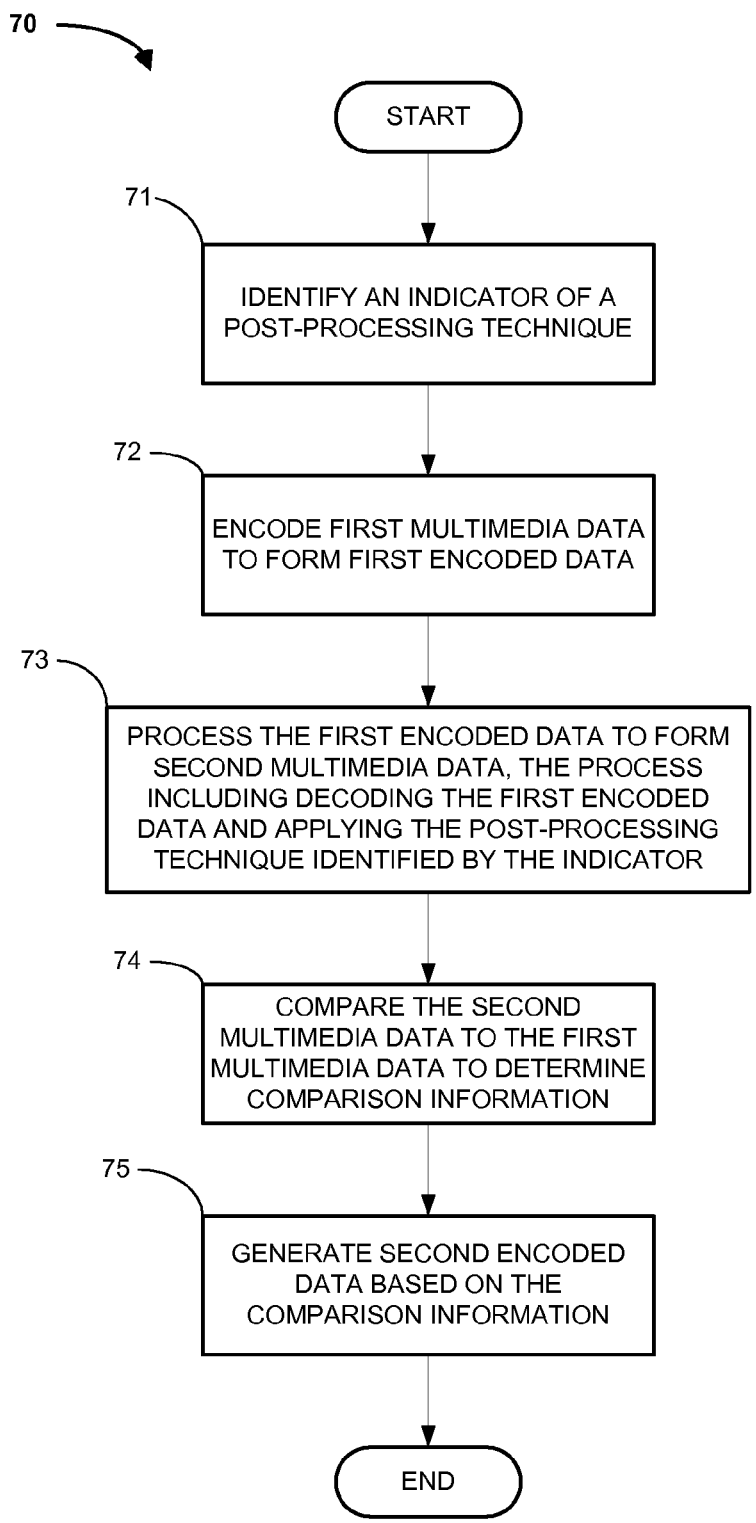
FIG. 7 is flowchart illustrating a process of encoding multimedia data.

FIG. 7 illustrates an example of a process 70 of encoding multimedia data by encoding structures such as encoding device 20 (FIG. 2), encoding device 30 (FIG. 3) encoding device 40 (FIG. 4) and encoding device 50 (FIG. 5). At state 71, the process maintains an indicator of a post-processing technique. For example, the post-processing technique can be used in a decoder of a display device, e.g., terminal 16 (FIG. 1). The metadata can also indicate a well known or popular processing technique without knowing specifically what post-processing technique, if any, is performed at the receiving display device. Received first multimedia data is encoded to form first encoded multimedia data at state 72.

Process 70 generates second multimedia data at state 73 by decoding the first encoded multimedia data and applying a post-processing technique identified by the indicator. The post-processing technique can be one of the post-processing techniques described herein, or another post-processing technique. At state 74, the process 70 compares the second multimedia data to the first multimedia data to determine comparison information. The comparison information can be difference information indicative of differences between the second multimedia data and the first multimedia data. At state 75, process 70 then encodes the comparison information to form assist information (second encoded data). The assist information and the encoded multimedia data can subsequently be communicated to a display device, which can use the assist information to decode the multimedia data.

Figure 10:
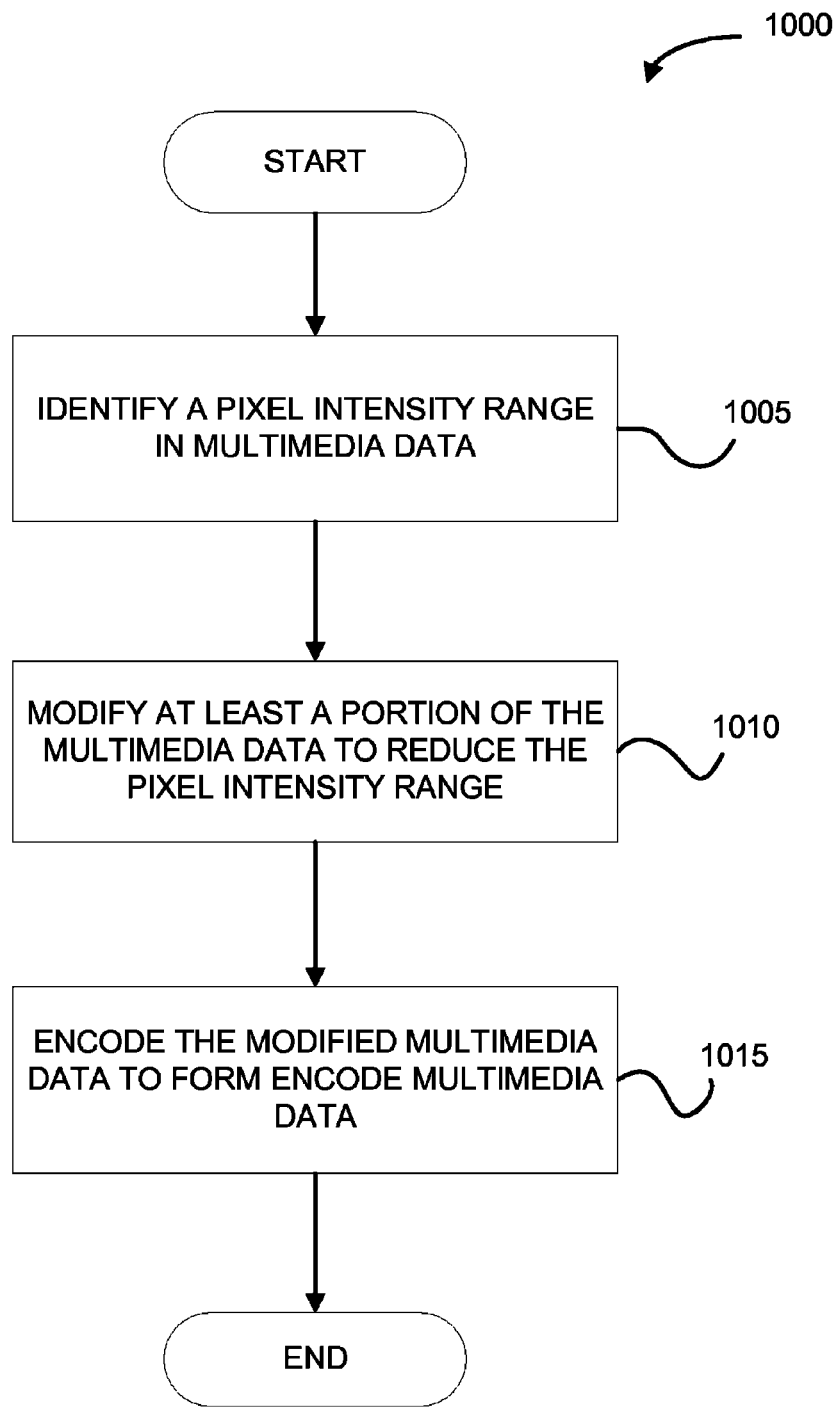
FIG. 10 is a flowchart illustrating a process of encoding multimedia data by remapping pixel brightness values of at least a portion of the multimedia data.

FIG. 10 is a flowchart illustrating a process 1000 of encoding multimedia data by reducing the pixel luminance intensity range of at least a portion of multimedia data before the multimedia data is encoded, such as performed by encoder 1120 of FIG. 11. At state 1005, process 1000 identifies a pixel luminance intensity range in the multimedia data. For example, if the multimedia data comprises an image, the process 1000 can identify, or determine, a pixel intensity range for that image. If the multimedia data comprises a sequence of images (e.g., video) a pixel intensity range can be identified for one or more of the images. The pixel intensity range can be, for example, the range of luminance values of the pixels in the image that contains 90% (or, e.g., 95%, or 99%) of the luminance values. In some embodiments, if the images in a image sequence are similar, the same pixel intensity range can be identified for all (or at least many) of the images in the image sequence. In some embodiments, the pixel luminance intensity range of two or more images can be identified and averaged.

At state 1010, process 1000 modifies a portion of the multimedia data to reduce the pixel luminance intensity range. Typically, pixel luminance values of an image are concentrated over a portion of the available intensity range. Reducing (or remapping) the pixel values to cover a smaller range can greatly reduce the amount of data in the image, which facilitates more efficient data encoding and transmission. Examples of reducing the pixel luminance intensity range include a "reverse" histogram equalization, gamma correction, or remapping the luminance values from the "full" range (e.g., 0-255 for eight-bit images) to a reduced range of only a portion of the original intensity range.

At state 1015, process 1000 encodes the modified multimedia data to form encoded data. The encoded data can be transmitted to a terminal device 16 (FIG. 1) where it is decoded. The decoder in the terminal device performs a process for expanding the intensity range of the multimedia data. For example, in some embodiments the decoder performs histogram equalization, gamma correction, or another image remapping process to expand the pixel values of the multimedia data across a pixel intensity range. The resulting expanded multimedia data may appear similar to its original appearance, or at least pleasing to view on a display of the terminal device. In some embodiments, an indicator indicative of the intensity range reduction can be generated, encoded, and transmitted to the terminal device. A decoder in the terminal device can use the indicator as assist information for decoding the received multimedia data.

It is noted that the aspects may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

It should also be apparent to those skilled in the art that one or more elements of a device disclosed herein may be rearranged without affecting the operation of the device. Similarly, one or more elements of a device disclosed herein may be combined without affecting the operation of the device. Those of ordinary skill in the art would understand that information and signals may be represented using any of a variety of different technologies and techniques. Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

In addition, the various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added without departing from the spirit or scope of the disclosed method and apparatus. The description of the aspects is intended to be illustrative, and not to limit the scope of the claims.

What is claimed is:

1. A method of processing multimedia data, the method comprising:
   receiving an indication of a post processing technique used in a decoder of a terminal device from the terminal device;
   identifying at least one pixel intensity range in at least one image of multimedia data;
   modifying, based on the indication of the post processing technique used in the decoder of the terminal device, at least a portion of the multimedia data to reduce the at least one pixel intensity range;
   encoding the modified multimedia data to form encoded multimedia data;
   generating an indicator indicative of the modification made to the multimedia data to reduce the at least one pixel intensity range; and
   encoding the indicator via an encoding device.

2. The method of claim 1, further comprising transmitting the encoded multimedia data to the terminal device.

3. The method of claim 1, further comprising:
   maintaining the indicator indicative of the modification made to the multimedia data to reduce the at least one pixel intensity range,
   wherein encoding the indicator comprises encoding the indicator for transmission to a terminal device.

4. The method of claim 1, further comprising transmitting the indicator and the multimedia data to a terminal device.

5. The method of claim 1, wherein modifying the at least one pixel intensity range comprises an inverse histogram equalization operation.

6. The method of claim 1, wherein modifying the at least one pixel intensity range comprises gamma correction.

7. The method of claim 1, wherein the at least one pixel intensity range is modified based at least in part on a detected range of pixel values and a threshold value which defines a limit to a range of pixel intensity values.

8. The method of claim 1, wherein the identifying comprises identifying two or more pixel intensity ranges in at least one image of the multimedia data, and wherein the modifying comprises modifying the multimedia data to reduce the two or more pixel intensity ranges.

9. The method of claim 8, wherein the two or more pixel intensity ranges represent different image subject matter content of the at least one image.

10. The method of claim 8, wherein the two or more pixel intensity ranges represent different spatial locations of pixels of the at least one image.

11. The method of claim 8, wherein the two or more pixel intensity ranges represent different portions of an image histogram of the at least one image.

12. A system for processing multimedia data, comprising:
    an image processing module configured to receive an indication of a post processing technique used in a decoder of a terminal device from the terminal device and to identify a pixel intensity range of a portion of multimedia data, the image processing module further configured to modify, based on the indication of the post processing technique used in the decoder of the terminal device, the multimedia data to reduce the pixel intensity range; and
    an encoder configured to encode the modified multimedia data to form encoded multimedia data,
    wherein the image processing module generates an indicator indicative of the modification made to the multimedia data to reduce the pixel intensity range, and wherein the encoder is configured to encode the indicator.

13. The system of claim 12, wherein the encoder is configured to encode the indicator for transmission with the encoded multimedia data.

14. The system of claim 12, wherein modifying the at least one pixel intensity range comprises an inverse histogram equalization operation.

15. The system of claim 12, wherein modifying the at least one pixel intensity range comprises gamma correction.

16. The system of claim 12, wherein the image processing module is configured to identify two or more pixel intensity ranges in at least one image of the multimedia data, and modify the multimedia data to reduce the two or more pixel intensity ranges.

17. The system of claim 16, wherein the two or more pixel intensity ranges represent different image subject matter content of the at least one image.

18. The system of claim 16, wherein the two or more pixel intensity ranges represent different spatial locations of pixels of the at least one image.

19. The system of claim 16, wherein the two or more pixel intensity ranges represent different portions of an image histogram of the at least one image.

20. A system for processing multimedia data, comprising:
    means for receiving an indication of a post processing technique used in a decoder of a terminal device from the terminal device;
    means for identifying at least one pixel intensity range in at least one image of multimedia data;
    means for modifying, based on the indication of the post processing technique used in the decoder of the terminal device, at least a portion of the multimedia data to reduce the at least one pixel intensity range;
    means for encoding the modified multimedia data to form encoded multimedia data;
    means for generating an indicator indicative of the modification made to the multimedia data to reduce the at least one pixel intensity range; and
    means for encoding the indicator.

21. The system of claim 20, further comprising means for transmitting the encoded multimedia data to the terminal device.

22. The system of claim 20, further comprising:
   means for maintaining the indicator indicative of the modification made to the multimedia data to reduce the at least one pixel intensity range,
   wherein means for encoding the indicator comprises means for encoding the indicator for transmission to the terminal device.

23. The system of claim 20, wherein the means for modifying the at least one pixel intensity range comprises means for performing an inverse histogram equalization operation.

24. The system of claim 20, wherein the means for modifying the at least one pixel intensity range comprises means for performing gamma correction.

25. The system of claim 20, wherein means for modifying at least a portion of the multimedia data to reduce the at least one pixel intensity range comprises means for modifying at least a portion of the multimedia data based at least in part on a detected range of pixel values and a threshold value which defines a limit to a range of pixel intensity values.

26. The system of claim 20, wherein the means for identifying comprises means for identifying two or more pixel intensity ranges in at least one image of the multimedia data, and wherein the means for modifying comprises means for modifying the multimedia data to reduce the two or more pixel intensity ranges.

27. A non-transitory processor-readable storage medium having stored thereon processor-executable instructions configured to cause a processor to perform operations comprising:
   receiving an indication of a post processing technique used in a decoder of a terminal device from the terminal device;
   identifying at least one pixel intensity range in at least one image of multimedia data;
   modifying, based on the indication of the post processing technique used in the decoder of the terminal device, at least a portion of the multimedia data to reduce the at least one pixel intensity range;
   encoding the modified multimedia data to form encoded multimedia data;
   generating an indicator indicative of the modification made to the multimedia data to reduce the at least one pixel intensity, range; and
   encoding the indicator.

28. The non-transitory processor-readable storage medium of claim 27, wherein the stored processor-executable instructions are configured to cause a processor to perform operations further comprising:
   transmitting the encoded multimedia data to the terminal device.

29. The non-transitory processor-readable storage medium of claim 27, wherein the stored processor-executable instructions are configured to cause a processor to perform operations further comprising:
   maintaining the indicator indicative of the modification made to the multimedia data to reduce the at least one pixel intensity range
   encoding the indicator for transmission to the terminal device.

30. The non-transitory processor-readable storage medium of claim 27, wherein the stored processor-executable instructions are configured to cause a processor to perform operations further comprising:
   performing an inverse histogram equalization operation to modify the at least one pixel intensity range.

31. The non-transitory processor-readable storage medium of claim 27, wherein the stored processor-executable instructions are configured to cause a processor to perform operations further comprising:
   performing gamma correction to modify the at least one pixel intensity range.

32. The non-transitory processor-readable storage medium of claim 27, wherein the stored processor-executable instructions are configured to cause a processor to perform operations further comprising:
   modifying at least a portion of the multimedia data based at least in part on a detected range of pixel values and a threshold value which defines a limit to a range of pixel intensity values to modify at least a portion of the multimedia data to reduce the at least one pixel intensity range.

33. The non-transitory processor-readable storage of claim 27, wherein the stored processor-executable instructions are configured to cause a processor to perform operations further comprising:
   identifying two or more pixel intensity ranges in at least one image of the multimedia data; and
   modifying the multimedia data to reduce the two or more pixel intensity ranges.

* * * * *